Patented Aug. 25, 1953

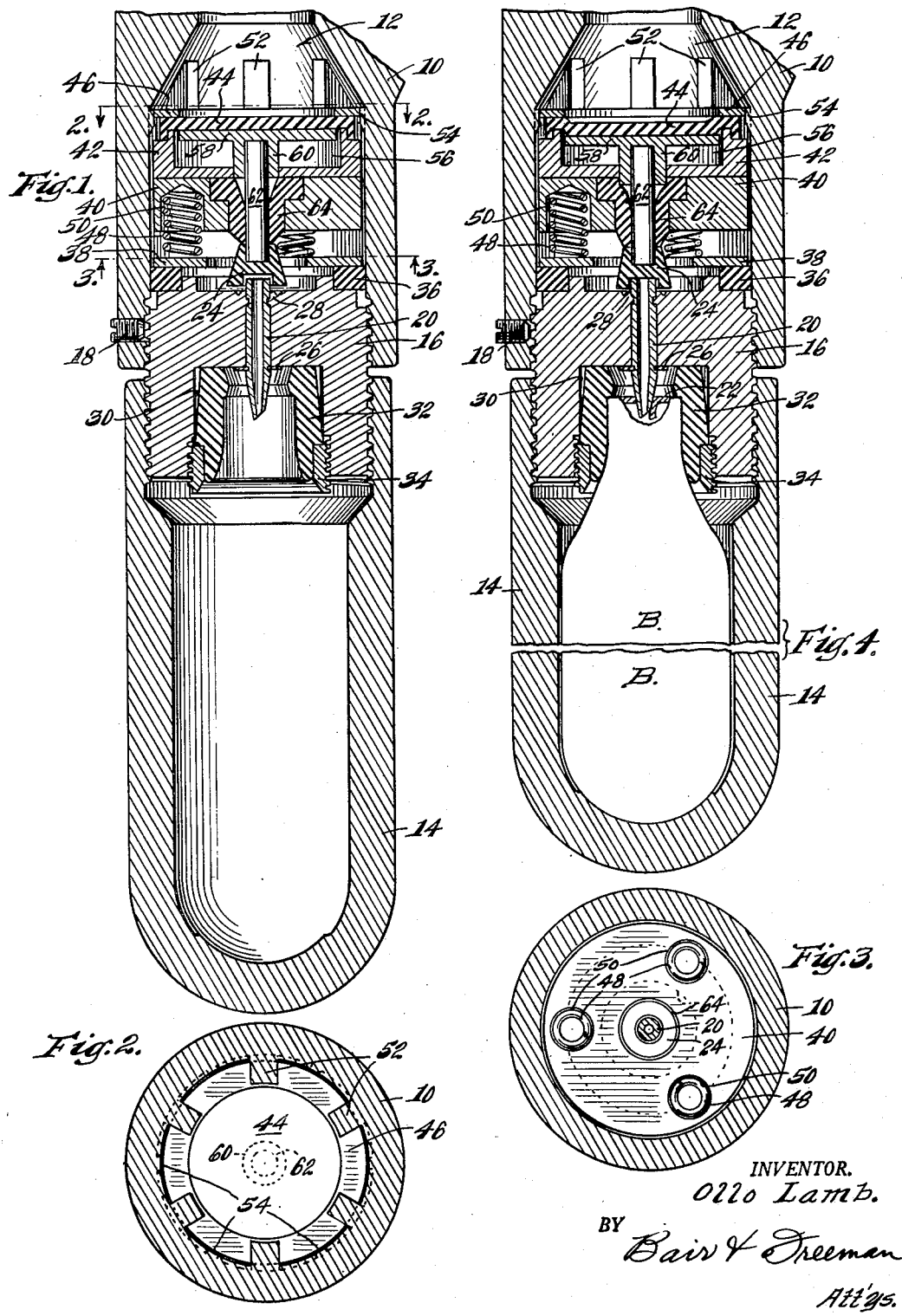

2,649,661

UNITED STATES PATENT OFFICE 2,649,661

REGULATOR VALVE

Ollo Lamb, St. Louis, Mo., assignor, by mesne assignments, to Knapp-Monarch Company, St. Louis, Mo., a corporation of Delaware Application August 3, 1946, Serial No. 688,197

2 Claims. (Cl. 50—21)

1

My present invention relates to a pressure regulator adapted for interposition between high and low pressure chambers.

An object of the invention is to provide a regulator valve of durable and inexpensive construction which is comparatively simple and compact and adapted for interposition between a high pressure gas bulb and a gas receiving device of any character such as a pressure sprayer of the type shown in the copending application of William B. Kochner and myself, Serial No. 22,118 filed April 20, 1948.

Another object of the invention is to provide a pressure regulator which permits a controlled flow of high pressure gas from a $CO_2$ bulb or the like to a chamber wherein the pressure is regulated to a value somewhat less than the initial pressure in the bulb, so that a substantially constant pressure can be maintained for the pressure sprayer or other apparatus that utilizes the pressure from the bulb.

Still another object is to provide a pressure regulator including a diaphragm on which reverse pressure operates to close a gas admission valve when the pressure on the diaphragm exceeds a predetermined value, a sealed chamber being provided under the diaphragm in opposition to the reversed pressure for returning the diaphragm when the pressure lowers, thereby admitting additional gas.

A further object is to provide a pressure regulator in the form of an assembly of diaphragm and valve retained in position by a closure plug that carries the valve seat, the plug being adjustable for varying the operating pressure of the regulator valve.

Still a further object is to provide a regulator valve composed of a small number of parts which are easily formed in automatic machinery and which can be readily assembled in a minimum of time, the device after assembly being readily adjustable to change the operating point.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a longitudinal sectional view through a regulator valve embodying my present invention and showing a bulb holder associated therewith;

Figure 2 is a sectional view on the line 2—2 of Figure 1;

Figure 3 is a sectional view on the line 3—3 of Figure 1; and

Figure 4 is a sectional view similar to Figure 1 showing the parts in a different position.

On the accompanying drawings, I have used the reference numeral 10 to indicate a body member which has a space 12 therein that may be termed a regulated pressure chamber.

A bulb holder 14 is associated with the body member 10, a connecting member or plug 16 being provided for connecting the two together. The exterior of the connecting member 16 is threaded and the interior of the body 10 as well as the bulb holder 14 is tapped for threaded coaction therewith. The connecting member 16 is normally retained rigidly in the body member 10 by means of a set screw 18.

The connecting member 16 supports a combined piercing pin and valve seat member 20, the lower end being sharpened for piercing the top wall 22 of a gas bulb B. The upper end is faced off to serve as a valve seat in conjunction with a valve cap 24. The member 20 is retained in position by a split washer 26 soldered in a groove of the tube 20 and to the member 16. The element 20 is also staked in position adjacent its upper end as indicated at 28.

Within a recess 30 of the member 16, a sealing sleeve 32 of neoprene or the like is held in position by a tubular bushing 34. The sleeve 32 is adapted to seal around the neck of the bulb B, when the bulb is forced into the sleeve by the holder 14.

Above the member 16 I provide the following elements that constitute the rest of my regulator valve: a gasket 36, a metal washer 38, a disc 40, a diaphragm disc 42, a diaphragm 44 and a metal washer 46. Interposed between the washer 38 and the disc 40 are three springs 48 located in sockets 50 of the disc 40. The springs compress the gasket 36 and compress the marginal edge of the diaphragm 44 between the diaphragm disc 42 and the washer 46. The washer is seated against a shoulder in the form of the lower surfaces of six lugs 52 formed in the body 10 and is centered by a plurality of circumferentially spaced ribs 54.

Below the diaphragm 44 is a chamber 56 within the diaphragm disc 42. Within this chamber a disc 58 is located and the disc has a hub 60 receiving the upper end of a valve stem 62. The lower end of the valve stem has the valve cap 24 mounted on it after passing through a resilient packing 64. The packing is located in the disc 40 and confined therein by the diaphragm disc 42.

Normally at atmospheric pressure when the parts are assembled, the cap 24 is unseated from the valve tube 20 but when gas pressure is introduced from the bulb B as in Figure 4 and the chamber 12 is closed by a valve or the like as shown in the above mentioned copending application, the gas flows upwardly around the peripheries of the discs 40 and 42 and the washer 46 into the chamber 12 and acts on the diaphragm 44 to depress it to the position shown in this figure for closing the valve. The closure will be effected at a predetermined pressure within the chamber 12 depending on the adjustment of the connecting member 16 in relation to the body member 10, in opposition to air compressed in the chamber 56, this being a dead air chamber closed off by the diaphragm and by the packing 64.

Whenever there is a reduction of pressure in the chamber 12 due to gas being used therefrom, the pressure of air in the chamber 56 aided by the pressure of gas through the tube 20 against the valve cap 24 will open the valve at 26—24 for admitting additional gas to the chamber 12. This will continue until the predetermined regulated pressure has been reached thereby depressing the diaphragm 44 again to the position of Figure 4.

From the foregoing description, it will be obvious that I have provided a very simple pressure regulating valve made of few parts capable of manufacture in small sizes, the patent drawings showing an enlargement of the actual device in order to show details more clearly. The regulator valve itself is but little larger in diameter than an ordinary $CO_2$ bulb and can thus be readily contained within a housing such as 10 that is approximately the same size as the ordinary type of bulb holder 14.

The springs 48 effectively seal the interior of the body member 10 from atmosphere at the gasket 36 and at the same time effectively seal the periphery of the diaphragm 44 against leakage between the chambers 12 and 56. The packing 64 seals the chamber 56 with respect to the interior of the body member 10.

I have found that the arrangement disclosed utilizing a chamber 56 eliminates the necessity of having a spring in opposition to the low side pressure on the top of the diaphragm 44, thus simplifying the construction considerably. At the same time the regulator is readily adjusted by rotating the connecting member 16 in relation to the body 10. This rotation can be effected while the bulb is in the position of Figure 4 as at that time the pressure between the threads of the bulb holder 14 and the connecting member 16 is ample to lock the two together and provide for such rotation. When the regulator has been set to the desired pressure, the connecting member 16 may be locked by tightening the set screw 18.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a pressure regulator of the class described, a body member open at one end and having an outlet at its other end, a shoulder in said body member adjacent said outlet, a diaphragm against said shoulder, a gas pressure chamber forming element against said diaphragm, spring means engaging said chamber forming member, a follower for said spring means, a gasket engaging said follower, a plug in the open end of said body member and engaging said gasket, a diaphragm follower in said chamber forming member, a stem projecting therefrom and through said chamber forming member, means for sealing said stem relative to said chamber forming member, a valve member on said stem outside of said means for sealing, a valve seat carried by said plug and adapted to be engaged by said valve member, and means for bypassing gas from said valve seat around said chamber forming member and said diaphragm past said shoulder to said outlet, the pressure in said outlet acting on said diaphragm in opposition to the gas trapped in said pressure forming chamber, the foregoing elements operating to reduce the flow and regulate the pressure of gas supplied to said plug and discharged from said outlet with the pressure of trapped air in said chamber forming member opposing pressure of gas in said outlet on said diaphragm and tending to open said valve when the outlet pressure on said diaphragm reduces below a predetermined minimum.

2. In a pressure regulator of the class described, a body member open at one end and having an outlet at its other end, a shoulder in said body member adjacent said outlet, a diaphragm against said shoulder, a gas pressure chamber forming element against said diaphragm, spring means engaging said chamber forming member, a follower for said spring means, a gasket engaging said follower, a plug in the open end of said body member and engaging said gasket, a diaphragm follower in said chamber forming member, a stem projecting therefrom and through said chamber forming member, means for sealing said stem relative to said chamber forming member, a valve member on said stem outside of said means for sealing, a valve seat carried by said plug and adapted to be engaged by said valve member, means for bypassing gas from said valve seat around said chamber forming member and said diaphragm past said shoulder to said outlet, the pressure in said outlet acting on said diaphragm in opposition to the gas trapped in said pressure forming chamber, the foregoing elements operating to reduce the flow and regulate the pressure of gas supplied to said plug and discharged from said outlet with the pressure of trapped air in said chamber forming member opposing pressure of gas in said outlet on said diaphragm and tending to open said valve when the outlet pressure on said diaphragm reduces below a predetermined minimum, said plug being movable in said body member to predetermine the operating pressure of said regulator by the relative positions of said valve seat and said valve member, and means for locking said plug against movement.

OLLO LAMB.

References Cited in the file of this patent

UNITED STATES PATENTS

| Number | Name | Date |
|---|---|---|
| 614,441 | Burnett | Nov. 22, 1898 |
| 915,204 | Montgomery | Mar. 16, 1909 |
| 973,609 | Abrams | Oct. 25, 1910 |
| 1,045,197 | Schuler | Nov. 26, 1912 |
| 1,885,000 | Muller | Oct. 25, 1932 |
| 2,261,364 | Grove | Nov. 4, 1941 |
| 2,270,304 | Jacobsson | Jan. 20, 1942 |
| 2,287,992 | Grove | June 30, 1942 |

FOREIGN PATENTS

| Number | Country | Date |
|---|---|---|
| 8,677 | Great Britain | of 1899 |
| 449,418 | France | of 1911 |
| 684,872 | Germany | of 1939 |